United States Patent
Nabeshima et al.

(10) Patent No.: US 10,365,000 B2
(45) Date of Patent: Jul. 30, 2019

(54) AIR CONDITIONING SYSTEM AND AIR CONDITIONING MANAGEMENT PROGRAM

(71) Applicant: DAIKIN INDUSTRIES, LTD., Osaka-shi, Osaka (JP)

(72) Inventors: Norihiro Nabeshima, Kusatsu (JP); Makoto Ikeda, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 379 days.

(21) Appl. No.: 15/100,113

(22) PCT Filed: Nov. 20, 2014

(86) PCT No.: PCT/JP2014/080717
§ 371 (c)(1),
(2) Date: May 27, 2016

(87) PCT Pub. No.: WO2015/080012
PCT Pub. Date: Jun. 4, 2015

(65) Prior Publication Data
US 2017/0038086 A1    Feb. 9, 2017

(30) Foreign Application Priority Data
Nov. 29, 2013  (JP) ................. 2013-248643

(51) Int. Cl.
*F24F 11/30*  (2018.01)
*F24F 11/62*  (2018.01)
(Continued)

(52) U.S. Cl.
CPC ............. *F24F 11/62* (2018.01); *F24F 11/30* (2018.01); *H04M 1/72533* (2013.01);
(Continued)

(58) Field of Classification Search
CPC . F24F 11/30; F24F 11/58; F24F 11/52; G05B 19/048; G05B 19/00
(Continued)

(56) References Cited

U.S. PATENT DOCUMENTS 6,643,611 B1 * 11/2003 Ito ..................... F24F 11/30
702/184
9,733,001 B2 * 8/2017 Lim .................. F25B 49/022
(Continued)

FOREIGN PATENT DOCUMENTS

EP    1 196 002 A1   9/2001
JP    2000-283529 A  10/2000
(Continued)

OTHER PUBLICATIONS

Third Party Observation for corresponding EP Application No. 14 86 6157.2 dated Sep. 15, 2017.
(Continued)

*Primary Examiner* — Michael J Brown
(74) *Attorney, Agent, or Firm* — Global IP Counselors, LLP

(57) ABSTRACT

An air conditioning system includes air conditioners having at least one installed function of multiple functions, a mobile terminal carried by a user, and information mediation devices configured to carry out exchange of information between the air conditioners and the mobile terminal using a public network. The mobile terminal has an air conditioning management program configured to manage the air conditioners. The air conditioners store installed function information relating to the functions installed in the air conditioners. The air conditioning management program of the mobile terminal reads out the installed function information via the information intermediation devices, and generates, in accordance with the installed function infor-
(Continued)

mation, an air conditioner management screen image displayed on a display of the mobile terminal.

23 Claims, 9 Drawing Sheets

(51) Int. Cl.
| | | |
|---|---|---|
| *F24F 11/56* | (2018.01) | |
| *H04M 1/725* | (2006.01) | |
| *G05B 15/02* | (2006.01) | |
| *G05B 19/00* | (2006.01) | |
| *G06F 21/35* | (2013.01) | |
| *F24F 11/58* | (2018.01) | |
| *F24F 11/52* | (2018.01) | |

(52) U.S. Cl.
CPC ............... *F24F 11/52* (2018.01); *F24F 11/56* (2018.01); *F24F 11/58* (2018.01)

(58) Field of Classification Search
USPC .................................. 700/276, 275, 277, 257
See application file for complete search history.

(56) References Cited

U.S. PATENT DOCUMENTS

| | | | |
|---|---|---|---|
| 2011/0145395 A1* | 6/2011 | Kawai | H04Q 9/00 709/224 |
| 2015/0032268 A1 | 1/2015 | Ino et al. | |
| 2015/0039135 A1* | 2/2015 | Mori | H02J 3/14 700/276 |
| 2016/0209073 A1* | 7/2016 | Masuda | F24F 11/0086 |
| 2017/0038086 A1 | 2/2017 | Nabeshima et al. | |

FOREIGN PATENT DOCUMENTS

| | | | |
|---|---|---|---|
| JP | 2004-289505 A | 10/2004 | |
| JP | 2009-111901 A | 5/2009 | |
| JP | 2009-133549 A | 6/2009 | |
| JP | 2009-246543 A | 10/2009 | |
| JP | 2012-237490 A | 12/2012 | |
| JP | 2013-238372 A | 11/2013 | |
| JP | 2015-105795 A | 6/2015 | |
| JP | 2015-129638 A | 7/2015 | |
| WO | 2013/145797 A1 | 10/2013 | |

OTHER PUBLICATIONS

International Search Report of corresponding PCT Application No. PCT/JP2014/080717 dated Feb. 17, 2015.
International Preliminary Report of corresponding PCT Application No. PCT/JP2014/080717 dated Jun. 9, 2016.
European Search Report of corresponding EP Application No. I 14 86 6157.2 dated Nov. 21, 2016.
European Search Report of corresponding EP Application No. 18 15 7859.2 dated May 14, 2018.

* cited by examiner

18a

| FUNCTION CONTENT | CODE | 0: YES, 1: NO |
|---|---|---|
| ACCUMULATED RUNNING TIME MEASUREMENT FUNCTION | XX1 | 0 |
| CONSUMED POWER MEASUREMENT FUNCTION | XX2 | 0 |
| LAUNDRY DRYING MODE RUNNING FUNCTION | XX3 | 1 |
| HUMAN PRESENCE DETECTION FUNCTION | XX4 | 0 |
| . . . | . . . | . . . . . |
| FUNCTION FOR CHANGING AIR FLOW DIRECTION BY REMOTE CONTROL | XXX | 1 |

FIG. 4

| LOGIN ID: XXXXXX | | | | | | |
|---|---|---|---|---|---|---|
| ADAPTOR DEVICE ID | AIR CONDITIONER DEVICE NICKNAME | INSTALLED FUNCTION | CODE | 0: YES, 1: NO | SET TEMPERATURE | ······ |
| AJ2600538 | LIVING ROOM AC | ○○○ | XX1 | 1 | 27°C | |
| | | ○○○ | XX2 | 1 | | |
| | | ○○○ | XX3 | 1 | | |
| | | ○○○ | XX4 | 0 | | |
| AJ2600539 | KID'S ROOM AC | ····· | ····· | ····· | ····· | |

AIR CONDITIONING SYSTEM AND AIR CONDITIONING MANAGEMENT PROGRAM

CROSS-REFERENCE TO RELATED APPLICATIONS

This U.S. National stage application claims priority under 35 U.S.C. § 119(a) to Japanese Patent Application No. 2013-248643, filed in Japan on Nov. 29, 2013, the entire contents of which are hereby incorporated herein by reference.

TECHNICAL HELD

The present invention relates to an air conditioning system and an air conditioning management program.

BACKGROUND ART

Recent years have seen the advent of air conditioning systems that permit the running status of an air conditioner to be checked while away from home, using a dedicated program downloaded to a smartphone. For example, Japanese Laid-open Patent Application No. 2004-289505 discloses a system with which an air conditioner can be controlled remotely from a mobile telephone or the like, via a communications network.

SUMMARY

Technical Problem

In the system disclosed in the aforementioned Japanese Laid-open Patent Application No. 2004-289505, it is necessary for a user to input an ID and password, initiate an operation program download request, and download the operation program to the mobile telephone. When new equipment is to be regulated, the most recent operation program compatible with that equipment is downloaded to enable use of the functions of the new equipment.

With air conditioning systems that have been marketed in recent years, guidance to the effect of prompting downloading of the latest version of the program, or prompting a version update, is provided with regard to dedicated programs for air conditioning management.

However, it is not necessarily the case that users will replace their air conditioner each time a new model comes on the market, and in most cases they will continue to use the same air conditioner for several years. To nevertheless compel all users to perform the task of downloading or performing a version update of an air conditioning management program every year runs contrary to user convenience.

An object of the present invention is to provide an air conditioning system and an air conditioning management program with which the time and effort imposed on users by the task of updating the air conditioning management program may be minimized.

<Solution to Problem>

An air conditioning system according to a first aspect of the present invention is provided with air conditioners having multiple functions; a mobile terminal; and information intermediation devices. The mobile terminal is carried by a user of the air conditioners, and has an air conditioning management program for management of the air conditioners. Using a public network, the information intermediation devices carry out exchange of information between the air conditioners and the mobile terminal. The air conditioners store installed function information which is information relating to the functions installed in the air conditioners. The air conditioning management program of the mobile terminal reads out the installed function information via the information intermediation devices, and in accordance with the installed function information, generates an air conditioner management screen image displayed on a display of the mobile terminal.

With this air conditioning system, installed function information is stored in the air conditioner. The air conditioning management program, having read out the installed function information and generated an air conditioner management screen image, displays the air conditioner management screen image on the display of the mobile terminal. In the past, each time that a new air conditioner was procured, it was necessary to download the corresponding new version of the air conditioning management program to the mobile terminal; with the air conditioning system of the present invention, however, the air conditioning management program has the function of using installed function information stored by the new air conditioner to generate an air conditioner management screen image, thereby Obviating the need to update the air conditioning management program on the mobile terminal. Specifically, with the air conditioning system according to the present invention, the time and effort imposed on users by the task of updating the air conditioning management program is minimized.

An air conditioning system according to a second aspect of the present invention is the air conditioning system according to the first aspect of the present invention, wherein the information intermediation devices have intermediate devices, and a server device. The intermediate devices are devices connected to the air conditioners. The intermediate devices send air conditioner information, including installed function information, to the server device. The server device is a device connected to the mobile terminal and to the intermediate devices through a public network. When there has been a request from the mobile terminal, the server device sends air conditioner information to the mobile terminal.

According to the aspect described above, the information intermediation devices are configured from at least the intermediate devices and the server device. The server device, which is connected to the mobile terminal through a public network, has the role of sending the mobile terminal, in response to a request from the mobile terminal, air conditioner information which has been sent by the intermediate devices. In this way, the server device for receiving requests from the mobile terminal is not connected directly to the air conditioner; instead, the intermediate devices are arranged between the server device and the air conditioners, and therefore there is no need for the air conditioners to have a function of connecting to the server device via a public network. In so doing, by removing the function of connecting to the server device via a public network from the air conditioners, and simply storing installed function information in the air conditioners, it is possible for the air conditioners to be managed remotely from the mobile terminal.

An air conditioning system according to a third aspect of the present invention is the air conditioning system according to the second aspect of the present invention, wherein the air conditioning management program of the mobile terminal has a control function for sending to the server device an air-conditioner-controlling control command, and/or a control function for sending to the intermediate device a control command to control the air conditioners. The server device receives the control command from the mobile terminal, and once the intermediate devices are connected, sends the control command to the intermediate devices. The intermediate devices, upon receiving the control command from the mobile terminal or the server device, send the control command to the air conditioners and control the air conditioners.

According to the aspect described above, the user can control the air conditioners from the mobile terminal.

An air conditioning system according to a fourth aspect of the present invention is the air conditioning system according to the second or third aspect of the present invention, wherein the intermediate devices periodically send the air conditioner information to the server device.

In a case in which the air conditioners and the intermediate devices are installed at user's residences, and the server device is installed somewhere other than the user's residences, due to communications security restrictions it may be difficult for the server device to independently acquire information with respect to the intermediate devices and/or the air conditioners. However, in this air conditioning system, because air conditioner information is periodically sent from the intermediate devices to the server device, the server device holds relatively recent air conditioner information. Consequently, an air conditioner management screen image based on new air conditioner information can be obtained, even when the mobile terminal relies on the server device to send air conditioner information.

An air conditioning system according to a fifth aspect of the present invention is the air conditioning system according to any of the second to fourth aspects of the present invention, wherein the intermediate devices send the air conditioner information, including the installed function information, to the server device when the server device is initially accessed from the mobile terminal. The server device assigns identifying codes to the intermediate devices, and manages the air conditioner information sent from the intermediate devices.

According to the aspect described above, identifying codes are assigned to the intermediate devices, and management of air conditioner information in the server device takes place using the identifying codes. Once the user has initially accessed the server device from the mobile terminal, the start of management of air conditioner information in the server device is triggered thereby, whereby it is possible to subsequently send a request from the mobile terminal to the server device and procure the air conditioner information.

An air conditioning system according to a sixth aspect of the present invention is the air conditioning system according to the any of the first to fifth aspects of the present invention, wherein the installed function information includes at least one item of information from among first to fifth information. The first information is information indicating whether the air conditioner has a time measurement function for measuring accumulated running time. The second information is information indicating whether the air conditioner has a power measurement function for measuring consumed power. The third information is information indicating whether the air conditioner has a function for running in drying mode to dry laundry. The fourth information is information indicating whether the air conditioner has a human presence detection function for detecting a human presence near the air conditioner. The fifth information is information indicating whether the air conditioner has an air flow direction change function for changing the air flow direction of the air conditioner by remote control.

According to the aspect described above, in a case in which, for example, the installed function information includes the first item of information, when the existing air conditioner has a time measurement function, but the next generation of air conditioners being marketed lacks a time measurement function, then even when the user has purchased a replacement air conditioner, it will not be necessary to update the air conditioning management program of the mobile terminal which manages the existing air conditioners. Because the air conditioning management program of the mobile terminal recognizes from the installed function information stored in the new air conditioner that the unit lacks a time measurement function, air conditioner management screen images from which displays relating to time measurement are omitted are generated. In the event that the user has purchased an additional air conditioner, the air conditioning management program of the mobile terminal will generate, in relation to the existing air conditioner, air conditioner management screen images that include displays relating to time measurement, and in relation to the new air conditioner, will generate air conditioner management screen images from which displays relating to time measurement are omitted.

An air conditioning management program according to a seventh aspect of the present invention is an air conditioning management program for managing the air conditioners, for execution by the terminal device of the air conditioning system according to any of the first to sixth aspects of the present invention. This air conditioning management program is provided with an information request module, an information acquisition module, and a screen image generation module. The information request module requests an information intermediation device for air conditioner information including installed function information. The information acquisition module receives the air conditioner information from the information intermediation devices. The screen image generation module, on the basis of the air conditioner information received by the information acquisition module, generates the air conditioner management screen image appropriate to the installed function information.

This air conditioning management program can receive air conditioner information including installed function information, and generate an air conditioner management screen image appropriate to the installed function information, whereby appropriate air conditioner management screen images can be displayed on the mobile terminal's display, even for air conditioners having different installed functions.

<Advantageous Effects of Invention>

In the air conditioning system according to the first aspect of the present invention, the air conditioning management program has the function of using installed function information stored in a new air conditioner to generate an air conditioner management screen image, thereby obviating the need to update the air conditioning management program of the mobile terminal, and minimizing the time and effort imposed on the user by the task of updating the air conditioning management program.

In the air conditioning system according to the second aspect, there is no need for the air conditioners to have a function for connecting to the server device via a public network.

In the air conditioning system according to the third aspect, the user can control the air conditioners from the mobile terminal.

In the air conditioning system according to the fourth aspect, the server device holds relatively recent air conditioner information, and an air conditioner management screen image based on new air conditioner information can be obtained, even when the mobile terminal relies on the server device to send air conditioner information.

In the air conditioning system according to the fifth aspect, once the user has initially accessed the intermediate device from the mobile terminal, it is possible to subsequently send a request from the mobile terminal to the server device and procure air conditioner information.

In the air conditioning system according to the sixth aspect, even when the user has, for example, purchased a replacement air conditioner, no update of the air conditioning management program of the mobile terminal which manages the existing air conditioners need be made.

In the air conditioning management program according to the seventh aspect, appropriate air conditioner management screen images can be displayed on the mobile terminal's display, even for air conditioners having different installed functions.

BRIEF DESCRIPTION OF THE DRAWINGS

FIG. 4 is a diagram showing the content of installed function information of an air conditioner;

FIG. 5 is a diagram showing the content of data stored in an individual adaptor database on a server;

DESCRIPTION OF EMBODIMENTS

An air conditioning system 100 according to an embodiment of the present invention is described below, with reference to the drawings. The following embodiment is merely a specific example of the present invention and is not intended to limit the technical scope of the present invention, various modifications being possible within the spirit of the invention.

(1) Simplified Configuration of Air Conditioning System

Figure 1:
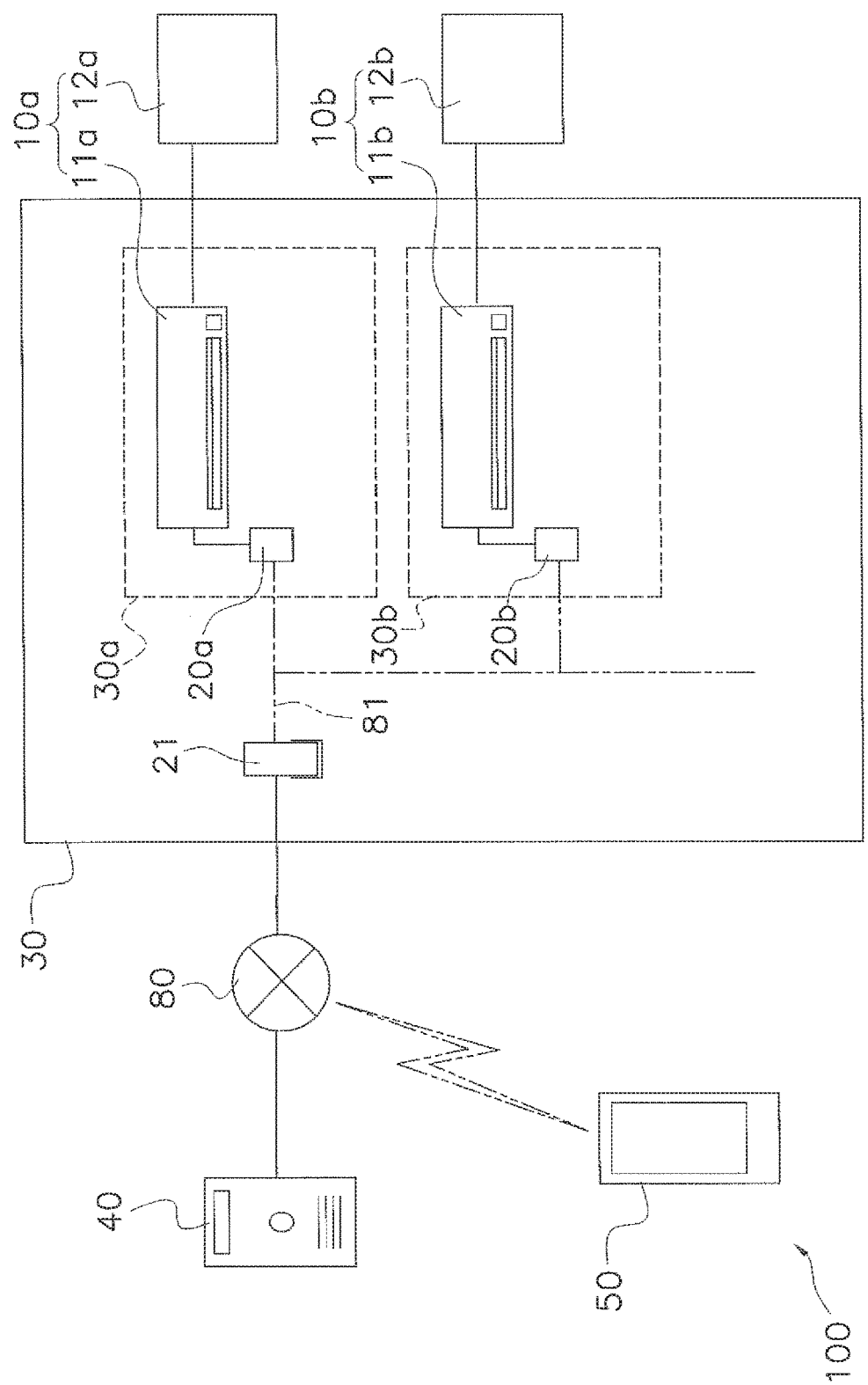
FIG. 1 is a simplified schematic view of an au conditioning system according to an embodiment of the present invention.

FIG. 1 shows an overall configuration of the air conditioning system 100. The air conditioning system 100 is a system for acquiring information about selected air conditioners 10a, 10b, . . . from a mobile terminal 50 belonging to a user via information intermediation devices, i.e., a server 40 and adaptors 20a, 20b, . . . , and for controlling the selected air conditioners 10a, 10b, . . . .

A router 21 that connects a public network 80 which includes the Internet, and a local area network (hereinafter "LAN") 81 set up inside a building 30 is installed in the building 30. The LAN 81 is a wireless LAN that utilizes the functions of the router 21, and provides wireless connections to the adaptors 20a, 20b, . . . which have wired connections to the air conditioners 10a, 10b, . . . . Besides the adaptors 20a, 20b, . . . , personal computers, printers, and other network devices, not illustrated, used in the building 30 may be connected to the LAN 81.

In order for the mobile terminal 50 to manage the air conditioners 10a, 10b, . . . via the server 40, it is necessary for the air conditioners 10a, 10b, . . . to be registered with the server 40 beforehand.

To facilitate understanding, a single building 30 is shown in FIG. 1; however, the actual air conditioning system 100 includes the air conditioners 10a, 10b, . . . distributed throughout multiple buildings 30. That is, the server 40 which is installed remotely from the building 30 over the public network 80 is administered by an air conditioner manufacturer or sales company, or by a maintenance company, with information for air conditioners in a large number of buildings 30 being amassed on the server 40.

(2) Detailed Configuration of Air Conditioning System (2-1) Air Conditioners

As shown in FIG. 1, the air conditioners 10a, 10b, are configured from indoor units 11a, 11b, . . . installed within rooms 30a, 30b, . . . of the building 30, and outdoor units 12a, 12b, . . . installed outside the building 30. The indoor units 11a, 11b, . . . are connected on a one-to-one basis to the adaptors 20a, 20b, . . . , discussed below.

The air conditioner 10a and the other air conditioners 10b, . . . have the same basic configuration. In the following description, the air conditioner 10a is taken as an example.

The indoor unit 11a and the outdoor unit 12a are connected via a refrigerant line, and form a refrigerant circuit configured from a compressor, heat exchangers, and the like, not illustrated.

Figure 2:
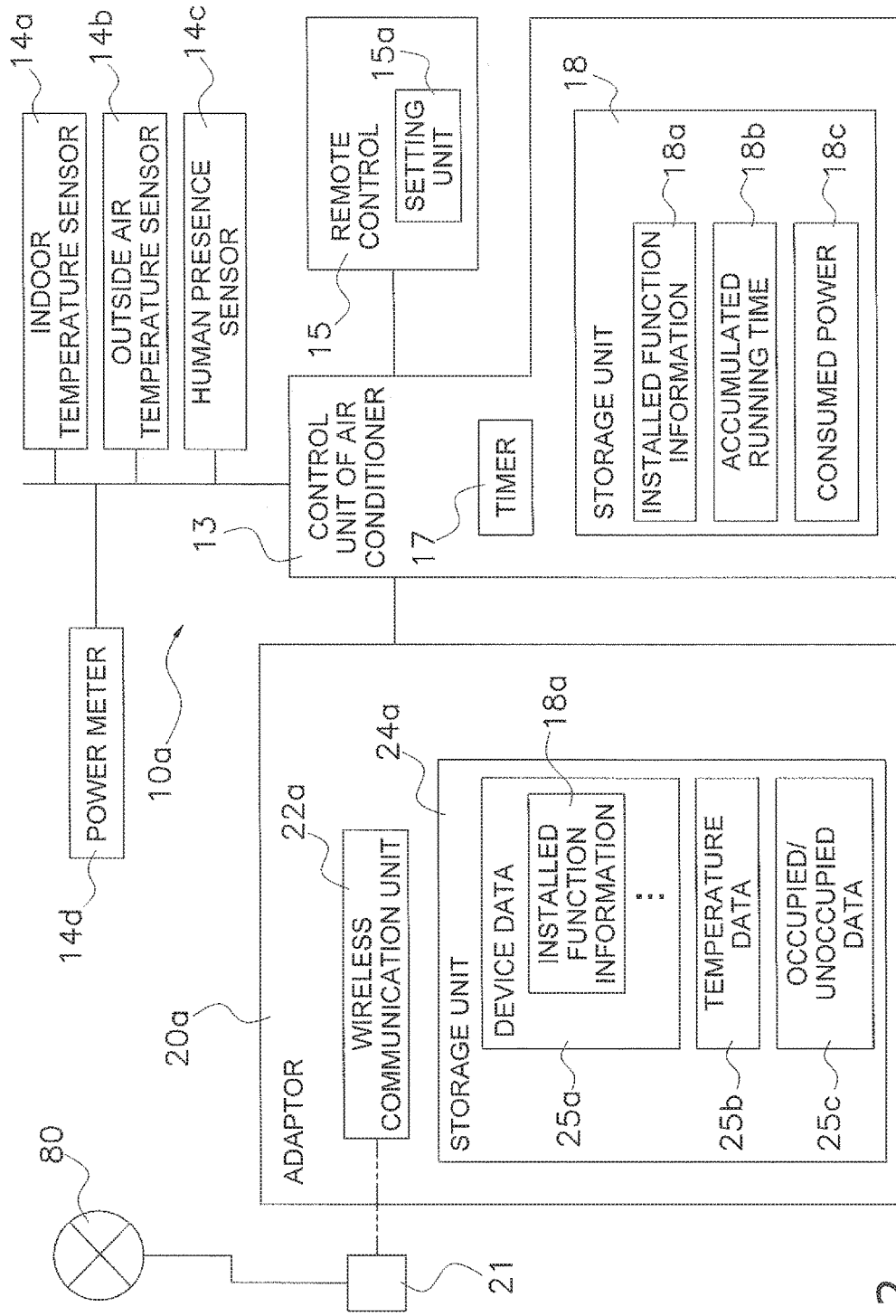
FIG. 2 is a control block diagram of a control unit of an air conditioner and an adapter connected thereto.

As shown in FIG. 2, the air conditioner 10a has various types of sensors. For example, the indoor unit 11a has an indoor temperature sensor 14a for detecting the temperature of the room 30a in which the indoor unit 11a is installed. The indoor unit 11a also has a human presence detection sensor 14c for detecting whether or not a person is present in the room 30a while the air conditioner 10a is running. As the human presence detection sensor 14c, there could be employed, for example, an infrared sensor. On the other hand, the outdoor unit 12a has an outside air temperature sensor 14b for detecting the temperature of the outside air near the building 30.

The air conditioner 10a has a control unit 13. The control unit 13 is configured from control units for the indoor unit 11a and the outdoor unit 12a included in the air conditioner 10a.

The control unit 13 controls the running of the air conditioner 10a, specifically, the actions of the compressor and the like included in the refrigerant circuit, in accordance with a run command directed to the air conditioner 10a and inputted by a user in the room 30 via a remote control 15.

The control unit 13 transmits device data 25a relating to the air conditioner 10a to the adaptor 20a. For example, the control unit 13 transmits to the adaptor 20a data indicating the content of a control command addressed to the indoor unit 11a input via the remote control 15. Data indicating the content of a control command may be an air conditioner 10a Start/Stop instruction, a running mode (cooling mode, heating mode, fan mode, or the like), a set temperature, or the like. The device data 25a sent to the adaptor 20a also includes installed function information 18a, accumulated running time 18b, consumed power 18c, and the like, discussed below.

The control unit 13 further transmits temperature data 25*b* relating to the indoor temperature and the outside air temperature to the adaptor 20*a*. In specific terms, the control unit 13 transmits to the adaptor 20*a* indoor temperature data detected by the indoor temperature sensor 14*a* and outside air temperature data detected by the outside air temperature sensor 14*b*.

On the basis of a detection result from the human presence detection sensor 14*c*, the control unit 13 decides whether or not a person is present in the room 30*a* in which the indoor unit 11*a* is installed. In specific terms, in the event that the human presence detection sensor 14*c* has not detected any person to be present for a continuous prescribed time period (5 minutes for example), the control unit 13 decides that the room 30*a* is in an unoccupied state in which no person is present. On the other hand, in the event that a person is detected by the human presence detection sensor 14*c* after a decision of an unoccupied state has been made, the control unit 13 decides that the room 30*a* is in an occupied state in which a person is present. The control unit 13 then transmits data 25*c* relating to the decision result, i.e., unoccupied or occupied, to the adaptor 20*a*.

The control unit 13 executes control commands transmitted from the adaptor 20*a*. A control command transmitted from the adaptor 20*a* could be, for example, a run command addressed to the indoor unit 11*a*, or a command instructing to transmit specific device data to the adaptor 20*a*.

In addition to the CPU, the control unit 13 is provided with a storage unit 18 comprising a RAM and/or a ROM. The storage unit 18 contains the installed function information 18*a* stored in the ROM, the accumulated running time 18*b* and/or consumed power 18*c* stored in the RAM, and the like. The accumulated running time 18*b* is the cumulative running time of the air conditioner 10*a* as counted by a timer 17. The consumed power 18*c* is the power consumed by the air conditioner 10*a* as measured by a power meter 14*d*.

The installed function information 18*a* is information that relates to installed functions of the air conditioner 10*a*. As shown in FIG. 4, the installed function information 18*a* is information classifying a multitude of functions with which an air conditioner is potentially provided, into functions that are actually installed in the air conditioner 10*a*, and functions that are not installed. In the air conditioning system 100, the installed function information 18*a* includes first information (symbol XX1, in FIG. 4), second information (symbol XX2 in FIG. 4), third information (symbol XX3 in FIG. 4), fourth information (symbol XX4 in FIG. 4), and fifth information (symbol XXX in FIG. 4). The first information is information indicating whether the air conditioner 10*a* has a time measurement function for measuring the accumulated running time. The second information is information indicating whether the air conditioner 10*a* has a power measurement function for measuring consumed power. The third information is information indicating whether the air conditioner 10*a* has a function to run in drying mode to dry laundry. The fourth information is information indicating whether the air conditioner 10*a* has a human presence detection function for detecting a human presence near the air conditioner 10*a*. The fifth information is information indicating whether the air conditioner 10*a* has an air flow direction change function for changing the air flow direction of blown air-conditioning air from the air conditioner 10*a* by remote control. According to the installed function information 18*a* shown in FIG. 4, the air conditioner 10*a* is not provided with a function for running in laundry drying mode, or a function for changing the air flow direction by remote control, but is provided with an accumulated running time measurement function, a consumed power measurement function, and a human presence detection function.

The installed function information 18*a* is sent to the adaptor 20*a* as part of the device data 25*a* in the manner described above, and is stored in the storage unit 24*a* of the adaptor 20*a*.

(2-2) Information Intermediation Devices

The information intermediation devices are devices that, using the public network 80, carry out exchange of information between the air conditioners 10*a*, 10*b*, . . . and the mobile terminal 50. In the air conditioning system 100, the information intermediation devices are configured from the adaptors 20*a*, 20*b*, . . . , the router 21, and the server 40.

(2-2-1) Adaptors

The adaptors 20*a*, 20*b*, . . . are network adaptors for connecting the air conditioners 10*a*, 10*b*, . . . to the LAN 81, and in the present embodiment are externally attached to the indoor units 11*a*, 11*b*, . . . . It is also acceptable for the adaptors 20*a*, 20*b*, . . . to be incorporated into the indoor units 11*a*, 11*b*, . . . .

The adaptor 20*a* and the other adaptors 20*b*, . . . are completely identical in configuration. The following description takes the example of the adaptor 20*a*.

As shown in FIG. 2, the adaptor 20*a* has, in addition to a CPU, a wireless communication unit 22*a* and/or a storage unit 24*a*. In addition to a communication function that adjusts for differences in communication protocols among networks, the adaptor 20*a* has a control function for controlling the air conditioners 10*a*, 10*b*, . . . . The adaptor 20*a* is connected by a wired connection to the control unit 13 of the indoor unit 11*a* and, while omitted from the illustration, is activated by power supplied from the indoor unit 11*a*.

The storage unit 24*a* stores the device data 25*a*, the temperature data 25*b*, the occupied/unoccupied data 25*c*, and the like. As mentioned above, the data 25*a*, 25*b*, 25*c* . . . is data relating to the air conditioner 10*a*, and has been transmitted to the adaptor 20*a* from the air conditioner 10*a*. The adaptor 20*a* periodically (once a minute in the present embodiment) compiles the data 25*a*, 25*b*, 25*c* as information about the air conditioner 10*a* and transmits the data to the server 40 via the public network 80.

A server address is also stored in advance in the storage unit 24*a*. A device ID assigned to the adaptor 20*a* by the server 40 is also stored in the storage unit 24*a*. The device ID, which is an identifying code of the adaptor 20*a*, is information by which the adaptor 20*a* can be uniquely recognized by the server 40.

(2-2-2) Router

The router 21 is a communication device that has a WAN-end interface and a LAN-end interface, and interconnects the two networks. When the adaptors 20*a*, 20*b*, . . . are connected to the LAN 81, the router 21 automatically detects the presence of the adaptors 20*a*, 20*b*, . . . , and carries out registration of network information of the adaptors 20*a*, 20*b*, . . . . In so doing, it is possible for the adaptors 20*a*, 20*b*, . . . to communicate with other network devices on the LAN 81 and with network devices on the public network 80 (on the Internet).

In this air conditioning system 100, the router 21 also has the role of building the LAN 81 inside the building 30.

(2-2-3) Server

Figure 3:
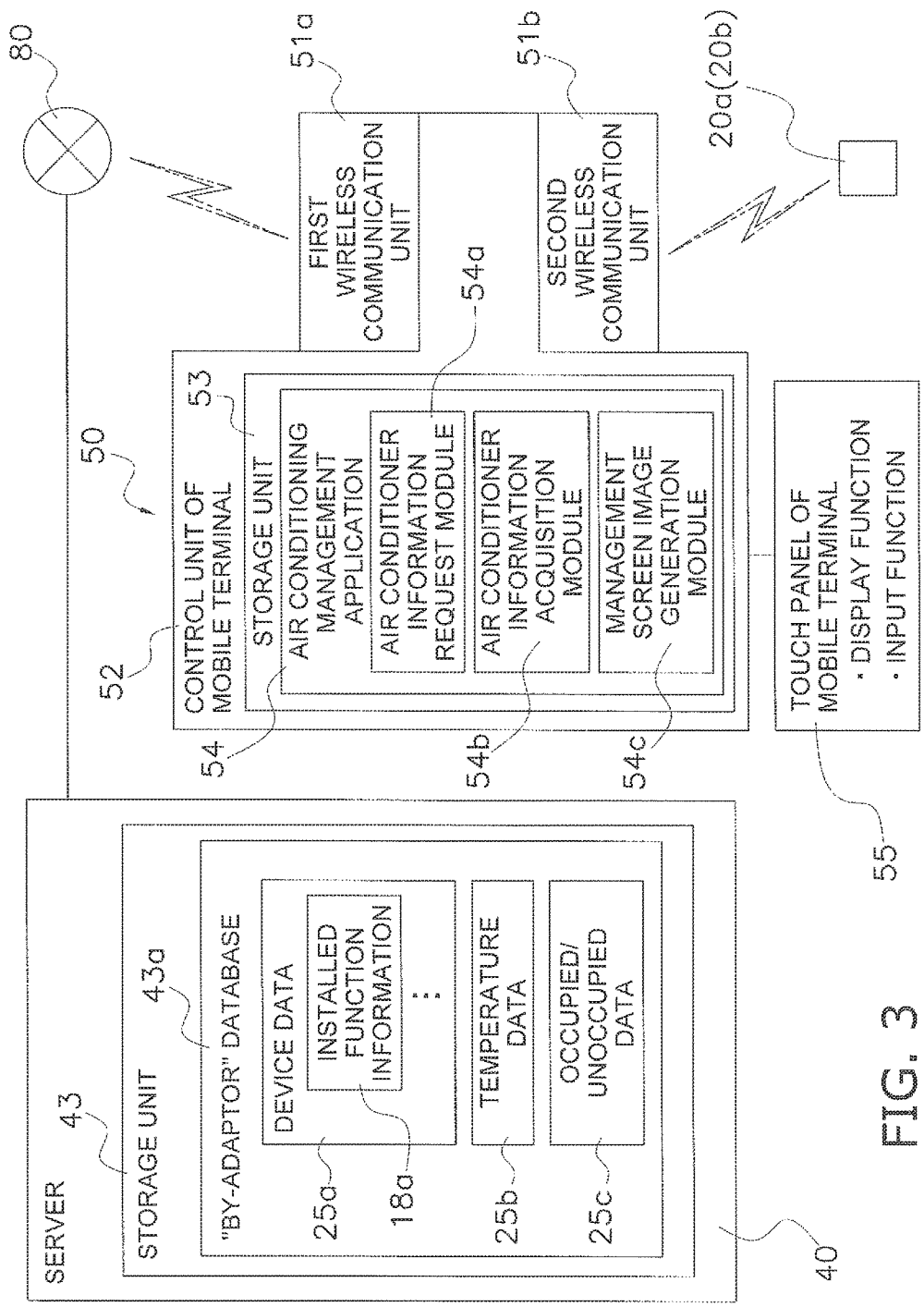
FIG. 3 is a control block diagram of a mobile terminal control unit and a server.

The server 40 is a computer located on the public network 80 (on the Internet) and running server software in order to carry out an air conditioning management service. As shown in FIG. 3, the server 40 has a storage unit 43.

The storage unit 43 has a database in which data of various kinds relating to the air conditioners 10a, 10b, is accumulated. In specific terms, the storage unit 43 has an individual adaptor database 43a. The server 40 accumulates, for individual adaptors, the air conditioner device data 25a, temperature data 25b, occupied/unoccupied data 25c, and the like which is periodically sent from the adaptor 20a. As shown in FIG. 5, in this individual adaptor database 43a, various data relating to the air conditioners 10a, 10b, . . . is held in association with the device IDs which have been assigned to the adaptors 20a, 20b, . . . connected to these air conditioners 10a, 10b, . . . .

In the individual adaptor database 43a, information about the air conditioner to which an adaptor is connected, together with information about an air conditioner to which any related adaptor different from this adaptor, is held in single record form. For example, as described below, when the two adaptors 20a, 20b have been initially set from the same mobile terminal 50, the server 40 recognizes that the two adaptors 20a, 20b are related adaptors related to one another.

Also held in the individual adaptor database 43a is information about various settings made by the users of the air conditioners 10a, 10b, . . . . Information such as the device IDs of the adaptors 20a, 20b, . . . to which the registered air conditioners 10a, 10b, . . . are connected, discretionary device nicknames assigned to the air conditioners 10a, 10b, . . . by the users, installed function information 18a relating to functions installed on the air conditioners 10a, 10b, . . . , set temperatures for the air conditioners 10a, 10b, . . . , external control enable/disable (ON/OFF) parameters for the air conditioners 10a, 10b, . . . , individual user information, including a login ID and password, assigned to users of the air conditioners 10a, 10b, . . . , and the like is held as single records. Passwords are used for authentication of login privileges when users, using their user ID, login the server 40 through the public network 80.

In response to a request from a user's mobile terminal 50 executing an air conditioning management application 54, the server 40 transmits the various types of data held in the individual adaptor database 43a to the user's mobile terminal 50 via the public network 80.

Control commands for controlling the air conditioners 10a, 10b, . . . which have been received from the mobile terminal 50 via the public network 80 are transmitted by the server 40 to the adaptors 20a, 20b, . . . when accessed by the adaptors 20a, 20b, . . . .

(2-3) Mobile Terminal

As the mobile terminal 50 carried by the user of the air conditioners 10a, 10b, . . . there may be cited, for example, a mobile telephone, smartphone, tablet computer, notebook PC, or other such portable computer. The description hereinbelow takes the example of a smartphone 50 as the mobile terminal.

As shown in FIG. 3, the smartphone 50 is equipped with a control unit 52 that includes a CPU, first wireless communication unit 51a, second wireless communication unit 51b, and storage unit 53, and the like, as well as with a touch panel 55 that assumes an input/output function. The first wireless communication unit 51a has the function of connecting to the public network 80. The second wireless communication unit 51b carries out Wi-Fi communication, and has the role of connecting to the adaptors 20a, 20b, . . . via the LAN 81, rather than via the public network 80 in the building 30. The touch panel 55 functions as a display screen, and also functions as a control button. The control button is a button included in an image displayed on the display screen.

The air conditioning management application 54 for managing the air conditioners 10a, 10b, . . . from the smartphone 50 is installed on the smartphone 50. The air conditioning management application 54 is downloaded by the user from the server 40 via the public network 80. Via images generated and presented on the touch panel 55 by the air conditioning management application 54, the user can monitor information of the air conditioners 10a, 10b, . . . , or perform control of the air conditioners 10a, 10b, . . . . From the outset, this air conditioning management application 54 retains the Internet address of the server 40 which is the connection destination.

(3) Initial Settings

The air conditioning system 100 is readied for use by connecting the adaptors 20a, 20b, . . . to the air conditioners 10a, 10b, . . . , having the router 21 recognize the adaptors 20a, 20b, . . . , and downloading and installation of the air conditioning management application 54 onto the smartphone 50 by the user in the manner discussed above, followed by the user making initial settings in his or her residence or other building 30.

Once the adaptors 20a, 20b, . . . are connected to the air conditioners 10a, 10b, . . . , the adaptors 20a, 20b, . . . first acquire information about the air conditioners 10a, 10b, . . . , such as the device data 25a, the temperature data 25b, the occupied/unoccupied data 25c, and the like, and store this information to the storage unit 24a. Next, using a wireless connection setting function of the adaptors 20a, 20b, . . . , the user prompts the router 21 to recognize the adaptors 20a, 20b, . . . and connect the adaptors 20a, 20b, . . . to the LAN 81.

Next, while inside the building 30, the user starts up the air conditioning management application 54 installed on the smartphone 50. Upon doing so, the smartphone 50 which is executing the air conditioning management application 54 (hereinbelow referred to simply as the "air conditioning management application 54"), via the second communication unit 51b and the router 21, searches for the adaptors 20a, 20b, . . . which are connected to the LAN 81, and displays a list of these on the touch panel 55 as shown in FIG. 6.

Figure 6:
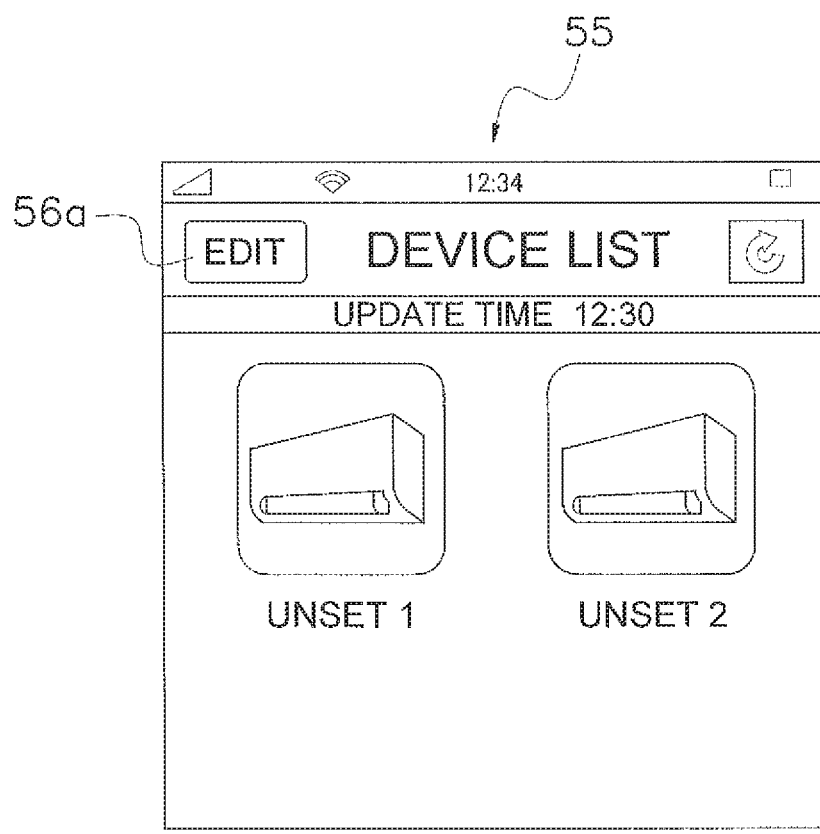
FIG. 6 is a diagram showing an air conditioner list screen image displayed on a touch panel of a smartphone at the time of initial setup.
Figure 7:
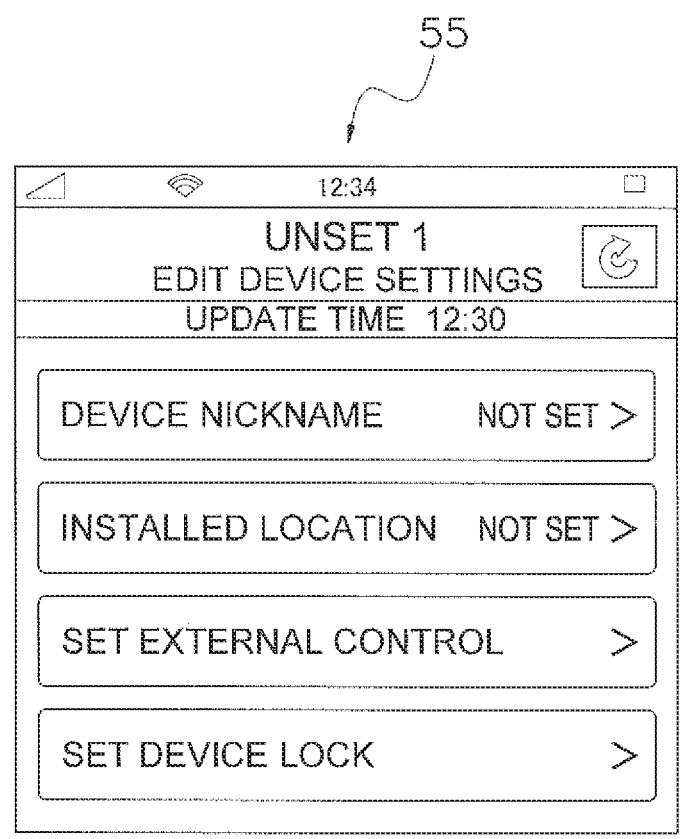
FIG. 7 is a diagram showing an air conditioner settings screen image displayed on a touch panel of a smartphone at the time of initial setup.

On the screen image shown in FIG. 6, when the user taps the icon for the device "Unset 1" and presses the "Edit" button 56a, a subsequent screen image for inputting a device nickname and installation location, and for making other settings, is displayed (see FIG. 7). Here, when, for example, "Living room AC" has been input as the device nickname, "Living room AC" subsequently appears in place of "Unset 1" in the air conditioner list screen image.

When "Set external control" shown in FIG. 7 is selected, and the setting is changed from "OFF" to "ON," the air conditioning management application 54 prompts the user for control input to perform initial settings needed for the air conditioner to be externally controlled from outside the building 30. In this instance, the user sets up a login ID and a password. In cases in which the air conditioning management application 54 recognizes that two or more of the adaptors 20a, 20b, . . . are present on the same LAN 81, the user can use the same login ID and password to manage these adaptors 20a, 20b, . . . . In cases in which the login settings are the same, when the air conditioners 10a, 10b, . . . are to be monitored and controlled from outside, these multiple devices are displayed and are selectable from the air condition list screen image.

Once a login ID and password have been set up, the adaptors 20*a*, 20*b*, . . . access the server 40 automatically via the router 21. At this time, the adaptors 20*a*, 20*b*, . . . transmit information identifying themselves to the server 40. The server 40, when accessed by the adaptors 20*a*, 20*b*, . . . , assigns device Ms to the adaptors 20*a*, 20*b*, . . . as described above, and using the device IDs appends records to the individual adaptor database 43*a*. The adaptors 20*a*, 20*b*, . . . , upon being sent device IDs by the server 40, store their own device ID in the storage unit 24*a*. Next, the adaptors 20*a*, 20*b*, . . . , in response to a request from the server 40, transmit to the server 40 information about the air conditioners 10*a*, 10*b*, . . . that includes the installed function information 18*a* in the storage unit 24*a*. The server 40 places the air conditioner 10*a*, 10*b*, . . . information sent to it by the adaptors 20*a*, 20*b*, . . . into the individual adaptor database 43*a* of the storage unit 43, in a format in which the information is associated with the device IDs of the adaptors 20*a*, 20*b*, . . . . During initial access from the outside by the user from the smartphone 50 using the login ID and password, the server 40 requests the adaptors 20*a*, 20*b*, . . . for the air conditioner 10*a*, 10*b*, . . . information.

Each individual "by-device ID" record in the individual adaptor database 43*a* is associated with both the login ID and password selected by user in the air conditioning management application 54 used to make the adaptor 20*a*, 20*b*, . . . settings. Records of every device ID of a plurality of the adaptors 20*a*, 20*b*, . . . that are managed using the same login ID and password may be stored together in a single record in the individual adaptor database 43*a* of the server 40, as shown in FIG. 5.

Once initial settings have been made, when the user starts up the air conditioning management application 54 on the smartphone 50, an initial screen image that includes input fields for login ID and password is displayed on the touch panel 55 of the smartphone 50. At this time, unless the user inputs the provided login ID and set password into the login ID and password input fields included in the initial screen image, the user cannot view the air conditioner 10*a*, 10*b*, . . . information stored in the storage unit 43 of the server 40 or control the air conditioners 10*a*, 10*b*, . . . from the air conditioning management application 54. This prevents unauthorized remote control of the air conditioning system 100.

(4) External Monitoring and Control of Air Conditioners Using Air Conditioning Management Application While the air conditioning management application 54 has several functions, the basic function modules are an air conditioner information request module 54*a*, an air conditioner information acquisition module 54*b*, and a management screen image generation module 54*c*.

When the air conditioner management application 54 on the smartphone 50 is started up while outside the building 30, and the login ID and password are input by the user, the air conditioner information request module 54*a* requests the server 40, via the first wireless communication unit 51*a*, for information about the air conditioners 10*a*, 10*b*, . . . that are connected to all of the adaptors 20*a*, 20*b*, . . . associated with that login ID. Upon receiving the information transmission request, the server 40 transmits to the smartphone 50 various types of data relating to the air conditioners 10*a*, 10*b*, . . . to which are connected the adaptors 20*a*, 20*b*, . . . , associated with the login ID in the individual adaptor database 43*a*. The various types of data relating to the air conditioners 10*a*, 10*b*, . . . includes the device data 25*a*, which includes the installed function information 18*a*; as well as the set temperature and other such temperature data 25*b*.

The data relating to the air conditioners 10*a*, 10*b*, . . . is received by the air conditioner information acquisition module 54*b* of the air conditioning management application 54, and is temporarily stored in memory in the smartphone 50. Then, on the basis of the installed function information 18*a* and other information relating to the air conditioners 10*a*, 10*b*, . . . , the management screen image generation module 54*c* of the air conditioning management application 54 generates a monitoring/control air conditioner management screen image which is displayed on the touch panel 55.

Figure 8:
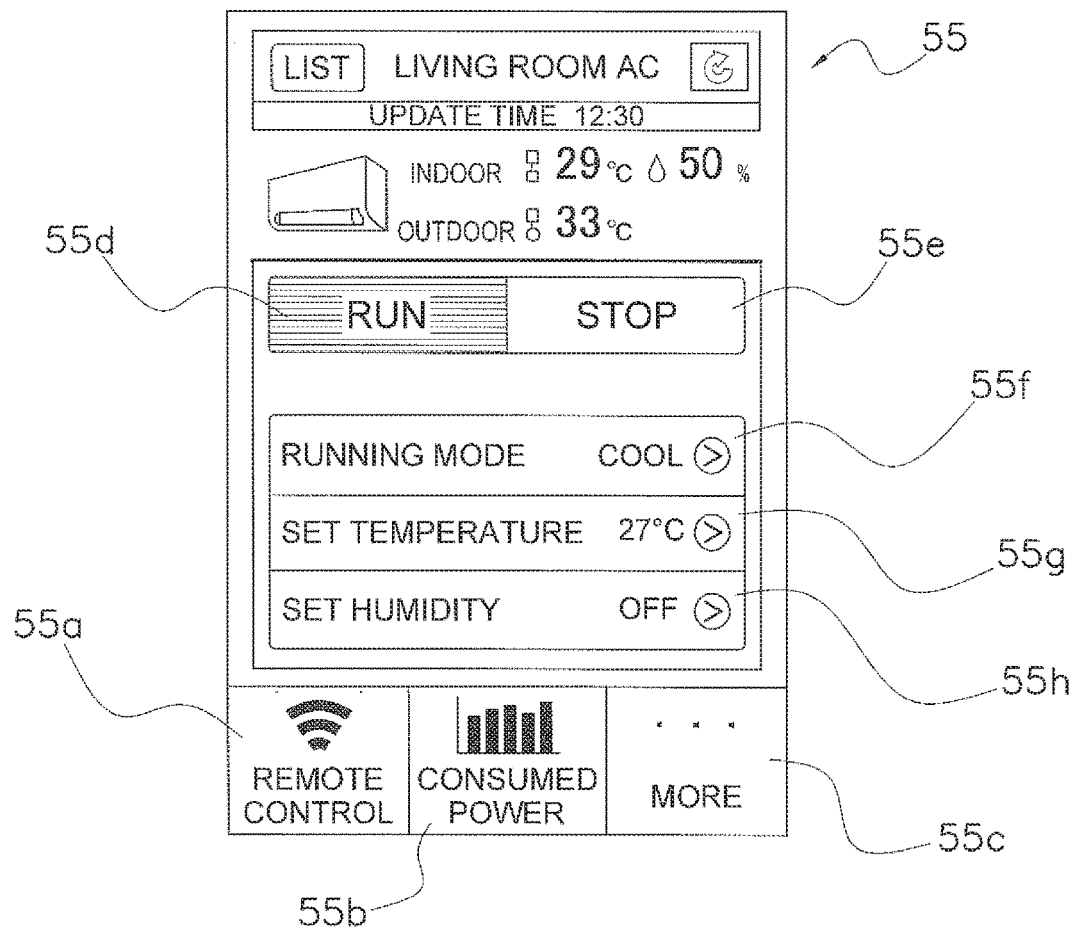
FIG. 8 is a diagram showing an example of an air conditioner management screen image of an air-conditioner selected by a user.

In specific terms, when the air conditioning management application 54 of the smartphone 50 is started up, first, a list image of the air conditioners 10*a*, 10*b*, . . . that it is possible to monitor and/or control is displayed. Then, when the user taps once on the icon of one of the air conditioners 10*a*, 10*b*, . . . included in the list image on the touch panel 55, an air conditioner management screen image for monitoring/control of the "Living room AC" like that shown in FIG. 8 for example is displayed. The management screen image generation module 54*c* refers to the temporarily stored data relating to the air conditioners 10*a*, 10*b*, . . . , and generates an air conditioner management screen image that includes screen images indicating an indoor temperature of 29° C., an outdoor temperature of 33° C., an indoor humidity of 50%, run/stop status, the "Cool" running mode, a set temperature of 27° C., and the like. The management screen image generation module 54*c* modifies the configuration of the air conditioner screen image according to the installed function information 18*a* of the "Living room AC." In the air conditioner management screen image shown in FIG. 8, reflecting the fact that the "Living room AC" is equipped with a consumed power measurement function as indicated by the installed function information 18*a* of FIG. 4, a "Consumed power" button 55*b* for bringing up a consumed power display screen image is displayed between a "Remote control" button 55*a* for bringing up a control screen image for remote control and a "More" button 55*c* for bringing up additional monitoring screen images.

Figure 9:
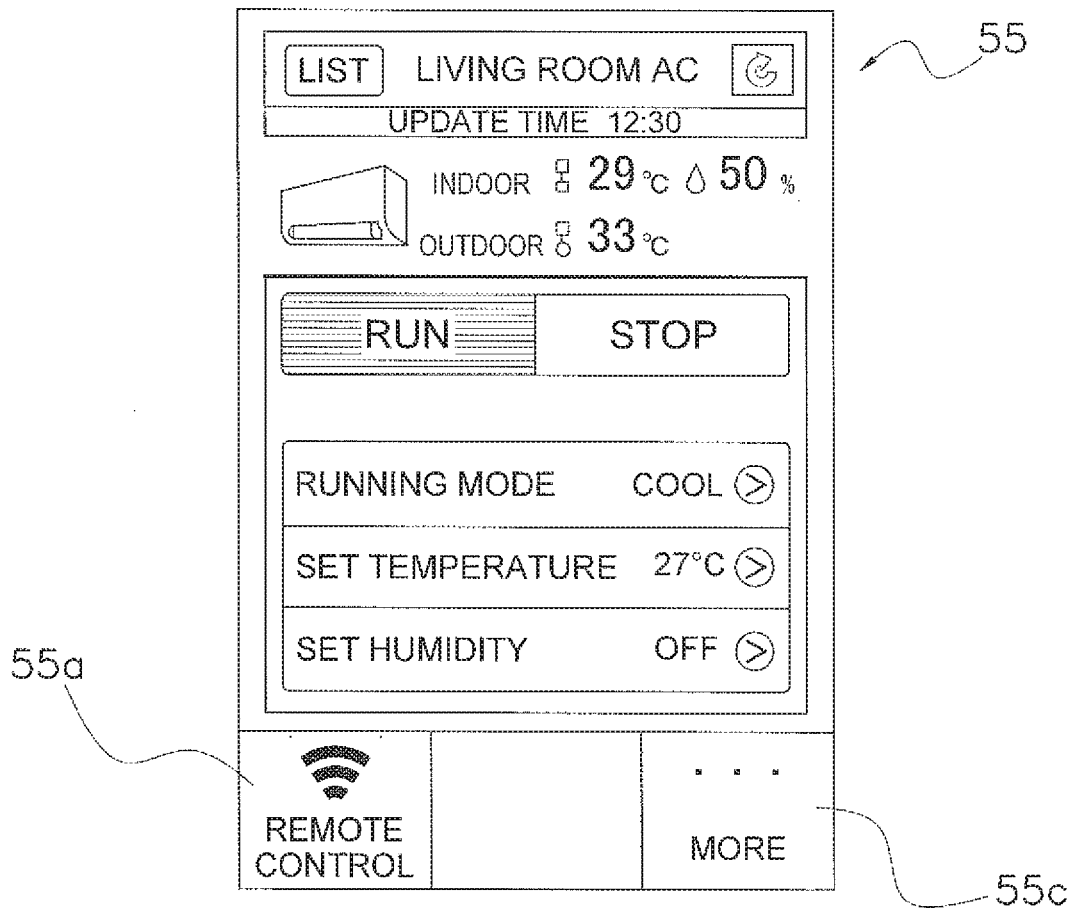
FIG. 9 is a diagram showing an example of an air conditioner management screen image for an air conditioner that lacks a consumed power measurement function.

Assume that a user has purchased a replacement living room AC, but that the new living room AC is an air conditioner that lacks a consumed power measurement function. In this case, the content of the installed function information 18*a* of the new air condition is different, a fact which is reflected in the installed function information 18*a* stored in the adaptor 20*a* and the server 40, so the installed function information 18*a* received by the air conditioner information acquisition module 54*b* of the air conditioner management application 54 will differ as well. Thus, the management screen image generation module 54*c*, which generates an air conditioner management screen image in accordance with the installed function information 18*a*, generates an air conditioner management screen image formatted according to the new "Living room AC," which does not have a consumed power measurement function. This air conditioner management screen image is shown in FIG. 9. In this air conditioner management screen image, no button is displayed between the "Remote control" button 55*a* and the "More" button 55*c*.

The air conditioner management application 54 receives control inputs to the air conditioners 10*a*, 10*b*, . . . from the user via air conditioner management screen images. When the user presses the "Stop" button 55*e* in the air conditioner management screen image shown in FIG. 8, a control command to switch the "Living room AC" from the running state to the stopped state is sent to the server 40, and the server 40, when accessed by the adaptors 20*a*, 20*b*, . . . , sends the control command to the adaptors 20*a*, 20*b*, . . . .

The adaptors 20a, 20b, . . . having received the control command send to the air conditioners 10a, 10b, . . . an instruction corresponding to the control command, specifically, in this instance, a stop instruction. Conversely, when the "Living room AC" is in the stopped state, and a "Run" button 55d in the air conditioner management screen image is pressed, a control command to switch the "Living room AC" to the running state is sent to the server 40. Further, when the user performs control input by pressing another button, i.e., a "Run mode" button 55f, a "Set temperature" button 55g, or a "Set humidity" button 55h, a control command is sent to the server 40 from the air conditioner management application 54.

(5) Monitoring and Control of Air Conditioners Using Air Conditioning Management Application from Inside the Building When the user, while inside the building 30, starts up the air conditioner management application 54 of the smartphone 50 and inputs the login ID and password, the air conditioner information request module 54a, via the second wireless communication unit 51b, requests the adaptors 20a, 20b, . . . for information about the air conditioners 10a, 10b, . . . which are connected to the adaptors 20a, 20b, . . . . Having received this information transmission request, the adaptors 20a, 20b, transmit to the smartphone 50 the various data relating to the air conditioners 10a, 10b, . . . , which is stored in the storage unit 24a. The various data relating to the air conditioners 10a, 10b, . . . includes the device data 25a which includes the installed function information 18a, the temperature data 25b such as the set temperature, and the like.

Up to the point that the air conditioner management screen image for monitoring and control is subsequently generated, the action of the air conditioner management application 54 of the smartphone 50 is the same as that when outside the building 30.

Additionally, up to the point that a control input to the air conditioners 10a, 10b, . . . is received from the user, the action of the air conditioner management application 54 of the smartphone 50 is the same as that when outside the building 30. However, when inside the building 30, control commands are transmitted from the smartphone 50 to the adaptors 20a, 20b, . . . via the second wireless communication unit 51b. Upon directly receiving the control command from the smartphone 50, the adaptors 20a, 20b, . . . send an instruction corresponding to the control command to the air conditioners 10a, 10b, . . . .

(6) Features (6-1)

In the air conditioning system 100, the installed function information 18a is stored in advance in the air conditioners 10a, 10b, . . . . The air conditioner management application 54, which reads out the installed function information 18a and generates air conditioner management screen images, prompts display of the air conditioner management screen images on the touch panel 55 of the smartphone 50. In the past, each time that one of the air conditioners 10a, 10b, . . . was new, it was necessary to download a corresponding new version of the air conditioner management application to the smartphone 50. With the air conditioning system 100, however, the air conditioner management application 54 has the function of using the installed function information 18a stored in the new air conditioner 10a, 10b, . . . when generating the air conditioner management screen images, and therefore it is not necessary to update the air conditioner management application 54 on the smartphone 50. Specifically, according to the air conditioning system 100, as long as the air conditioner is not newly equipped with an unknown function missing from the function items of the current installed function information 18a, the user is spared the time and effort of the task of updating the air conditioning management program 54.

For example, when installed function information 18a of the existing air conditioner 10b includes a time measurement function, but a subsequently marketed model of air conditioner lacks a time measurement function, even when the user has purchased a replacement air conditioner, it will not be necessary to update the air conditioning management program 54 of the smartphone 50 which manages the existing air conditioner 10b. Because the air conditioning management program 54 of the smartphone 50 can recognize, from the installed function information stored in the new air conditioner, that the unit lacks a time measurement function, the management screen image generation module 54c management screen image generation module 54c of the air conditioner management application 54 generates air conditioner management screen images from which displays relating to time measurement are omitted. In the event that the user has purchased an additional air conditioner, the air conditioning management program 54 of the smartphone 50 generates, in relation to the existing air conditioner 10b, air conditioner management screen images that include displays relating to time measurement, and in relation to the new air conditioner, generates air conditioner management screen images from which displays relating to time measurement are omitted.

(6-2)

In the air conditioning system 100, the adaptors 20a, 20b, . . . , the router 21, and the server 40 are utilized as information intermediation devices for intermediating between the air conditioners 10a, 10b, and the smartphone 50. The role of the server 40, which is connected to the smartphone 50 via the public network 80, is to send to the smartphone 50, in response to a request from the smartphone 50, information about the air conditioners 10a, 10b, . . . which has been sent to it by the adaptors 20a, 20b, . . . . In this way, the server 40 receiving the request from the smartphone 50 is not connected directly to the air conditioners 10a, 10b, . . . ; instead, because the adaptors 20a, 20b, . . . are arranged between the server 40 and the air conditioners 10a, 10b, . . . , in this instance there is no need for the air conditioners 10a, b, . . . to have a function of connecting to the server 40 via the public network 80. In so doing, by removing the function of connecting to the server 40 via a public network 80 from the air conditioners 10a, 10b, . . . , and simply storing the installed function information 18a in the air conditioners 10a, 10b, . . . , it is possible for the air conditioners 10a, 10b, . . . to be managed remotely from the smartphone 50.

(6-3)

In the air conditioning system 100, information about the air conditioners 10a, 10b, . . . is periodically sent to the server 40 by the adaptors 20a, 20b, . . . . In many instances, due to security concerns, access to the LAN 81 of the building 30 from the outside server 40 may be limited, but in this instance, information about the air conditioners 10a, 10b, . . . is sent each minute from the adaptors 20a, 20b, . . . to the server 40, and the individual adaptor database 43a of the server 40 is updated, whereby air conditioner management screen images based on new information air conditioners 10a, 10b, . . . can be obtained, even in the air conditioner management application 54 of the smartphone 50 which relies on information about the air conditioners 10a, 10b, . . . being sent to it by the server 40.

(6-4)

In the air conditioning system 100, the server 40 assigns device IDs to the adaptors 20*a*, 20*b*, . . . , and management of information about the air conditioners 10*a*, 10*b*, . . . in server 40 takes place using the device Ms as identifying codes. In specific terms, the individual adaptor database 43*a* creates and holds records of information about the air conditioners 10*a*, 10*b*, . . . for individual device IDs.

Consequently, from the standpoint of the user, when the server 40 is initially accessed from the smartphone 50, the start of automatic management of information about the air conditioners 10*a*, 10*b*, . . . in the server 40 is triggered thereby, and it is therefore possible to subsequently send a request from the smartphone 50 to the server 40 and procure information about the air conditioners 10*a*, 10*b*, . . . from outside the building 30.

What is claimed is:

1. An air conditioning system comprising:
    air conditioners having at least one installed function of multiple functions;
    a mobile terminal carried by a user of the air conditioners, and having an air conditioning management program configured to manage the air conditioners; and
    information intermediation devices configured to carry out exchange of information between the air conditioners and the mobile terminal using a communications network,
    the air conditioners storing installed function information relating to the functions installed in the air conditioners, and
    the air conditioning management program of the mobile terminal
        reading out the installed function information via the information intermediation devices, and
        generating, in accordance with the installed function information, an air conditioner management screen image displayed on a display of the mobile terminal,
    the information intermediation devices having intermediate devices connected to the air conditioners, and a server device connected to the mobile terminal and to the intermediate devices through the communications network,
    the intermediate devices sending the air conditioner information, including the installed function information, to the server device,
    when there has been a request from the mobile terminal, the server device sending the air conditioner information to the mobile terminal,
    the air conditioning management program of the mobile terminal having a control function configured to send an air-conditioner-controlling control command to at least one of the server device and the intermediate devices,
    the server device receiving the control command from the mobile terminal, and once the intermediate devices are connected, sending the control command to the intermediate devices, and
    the intermediate devices, upon receiving the control command from the mobile terminal or the server device, sending the control command to the air conditioners and control the air conditioners.

2. The air conditioning system according to claim 1, wherein
    the information intermediation devices have intermediate devices connected to the air conditioners, and a server device connected to the mobile terminal and to the intermediate devices through a public network,
    the intermediate devices send the air conditioner information, including the installed function information, to the server device, and
    when there has been a request from the mobile terminal, the server device sends the air conditioner information to the mobile terminal.

3. The air conditioning system according to claim 2, wherein
    the intermediate devices periodically send the air conditioner information to the server device.

4. The air conditioning system according to claim 2, wherein
    the intermediate devices send the air conditioner information, including the installed function information, to the server device when the server device is initially accessed from the mobile terminal, and
    the server device assigns identifying codes to the intermediate devices, and manages the air conditioner information sent from the intermediate devices.

5. The air conditioning system according to claim 4, wherein
    the intermediate devices send the air conditioner information, including the installed function information, to the server device when the server device is initially accessed from the mobile terminal, and
    the server device assigns identifying codes to the intermediate devices, and manages the air conditioner information sent from the intermediate devices.

6. The air conditioning system according to claim 1, wherein
    the installed function information includes at least one item of information selected from
        first information indicating whether the air conditioner has a time measurement function used to measure accumulated running time,
        second information indicating whether the air conditioner has a power measurement function used to measure consumed power,
        third information indicating whether the air conditioner has a function used to operate in a drying mode to dry laundry,
        fourth information indicating whether the air conditioner has a human presence detection function used to detect a human presence near the air conditioner, and
        fifth information indicating whether the air conditioner has an air flow direction change function used to change the air flow direction of the air conditioner by remote control.

7. The air conditioning system according to claim 1, wherein
    the air conditioning management program includes
        an information request module configured to request from the information intermediation devices the air conditioner information including the installed function information;
        an information acquisition module configured to receive the air conditioner information from the information intermediation devices; and
        a screen image generation module that, based on the air conditioner information received by the information acquisition module, generates the air conditioner management screen image appropriate to the installed function information.

8. The air conditioning system according to claim 1, wherein
the air conditioning management program of the mobile terminal reads out the installed function information, and generates the air conditioner management screen image displayed on the display of the mobile terminal according to whether each of the multiple functions is installed or not on the air conditioners.

9. The air conditioning system according to claim 8, wherein
the information intermediation devices have intermediate devices connected to the air conditioners, and a server device connected to the mobile terminal and to the intermediate devices through a public network,
the intermediate devices send the air conditioner information, including the installed function information, to the server device, and
when there has been a request from the mobile terminal, the server device sends the air conditioner information to the mobile terminal.

10. The air conditioning system according to claim 9, wherein
the intermediate devices periodically send the air conditioner information to the server device.

11. The air conditioning system according to claim 9, wherein
the intermediate devices send the air conditioner information, including the installed function information, to the server device when the server device is initially accessed from the mobile terminal, and
the server device assigns identifying codes to the intermediate devices, and manages the air conditioner information sent from the intermediate devices.

12. The air conditioning system according to claim 8, wherein
the installed function information includes at least one item of information selected from
first information indicating whether the air conditioner has a time measurement function used to measure accumulated running time,
second information indicating whether the air conditioner has a power measurement function used to measure consumed power,
third information indicating whether the air conditioner has a function used to operate in a drying mode to dry laundry,
fourth information indicating whether the air conditioner has a human presence detection function used to detect a human presence near the air conditioner, and
fifth information indicating whether the air conditioner has an air flow direction change function used to change the air flow direction of the air conditioner by remote control.

13. The air conditioning system according to claim 8, wherein
the air conditioning management program includes
an information request module configured to request from the information intermediation devices the air conditioner information including the installed function information;
an information acquisition module configured to receive the air conditioner information from the information intermediation devices; and
a screen image generation module that, based on the air conditioner information received by the information acquisition module, generates the air conditioner management screen image appropriate to the installed function information.

14. The air conditioning system according to claim 1, wherein
the installed function information is information classifying a multitude of functions with which the air conditioners are potentially provided into functions that are actually installed in the air conditioners and functions that are not installed.

15. The air conditioning system according to claim 1, wherein
the air conditioning management program is downloaded and installed onto the mobile terminal by the user, and
the air conditioning management program reads out the installed function information via the information intermediation devices when the air conditioning management program is started up by the user and the user login.

16. The air conditioning system according to claim 1, wherein
the communications network includes a Wi-Fi communication.

17. The air conditioning system according to claim 1, wherein
the information intermediation devices have a wireless communication unit that carries out exchange of information with the mobile terminal, using a Wi-Fi communication as the communications network.

18. The air conditioning system according to claim 17, wherein
the wireless communication unit has the role of connecting to the information intermediation device via the Wi-Fi communication in a building, rather than via a public network.

19. The air conditioning system according to claim 1, wherein
the air conditioning management program is downloaded and installed onto the mobile terminal by the user.

20. An air conditioning system comprising:
air conditioners having at least one installed function of multiple functions;
a mobile terminal carried by a user of the air conditioners, and having an air conditioning management program configured to manage the air conditioners; and
information intermediation devices configured to carry out exchange of information between the air conditioners and the mobile terminal using a communications network,
the air conditioners storing installed function information relating to the functions installed in the air conditioners, and
the air conditioning management program of the mobile terminal
reading out the installed function information via the information intermediation devices, and
generating, in accordance with the installed function information, an air conditioner management screen image displayed on a display of the mobile terminal,
the air conditioning management program of the mobile terminal having a control function configured to send an air-conditioner-controlling control command to at least one of the server device and the intermediate devices,
the server device receiving the control command from the mobile terminal, and once the intermediate devices are connected, sending the control command to the intermediate devices, and the intermediate devices, upon receiving the control command from the mobile terminal or the server device, sending the control command to the air conditioners and control the air conditioners.

21. The air conditioning system according to claim 20, wherein
the air conditioning management program of the mobile terminal reads out the installed function information, and generates the air conditioner management screen image displayed on the display of the mobile terminal according to whether each of the multiple functions is installed or not on the air conditioners.

22. The air conditioning system according to claim 20, wherein
the intermediate devices periodically send the air conditioner information to the server device.

23. The air conditioning system according to claim 20, wherein
the intermediate devices send the air conditioner information, including the installed function information, to the server device when the server device is initially accessed from the mobile terminal, and
the server device assigns identifying codes to the intermediate devices, and manages the air conditioner information sent from the intermediate devices.

* * * * *